US011658880B2

(12) United States Patent
Ghadimi et al.

(10) Patent No.: US 11,658,880 B2
(45) Date of Patent: May 23, 2023

(54) TRANSFER LEARNING FOR RADIO RESOURCE MANAGEMENT

(71) Applicant: Telefonaktiebolaget LM Ericsson (publ), Stockholm (SE)

(72) Inventors: Euhanna Ghadimi, Bromma (SE); Jonas Wiorek, Stockholm (SE); Sholeh Yasini, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 83 days.

(21) Appl. No.: 17/434,352

(22) PCT Filed: Feb. 27, 2019

(86) PCT No.: PCT/IB2019/051584
§ 371 (c)(1),
(2) Date: Aug. 26, 2021

(87) PCT Pub. No.: WO2020/174262
PCT Pub. Date: Sep. 3, 2020

(65) Prior Publication Data
US 2022/0158907 A1 May 19, 2022

(51) Int. Cl.
*H04L 29/08* (2006.01)
*H04L 41/16* (2022.01)
*H04L 41/044* (2022.01)

(52) U.S. Cl.
CPC ............ *H04L 41/16* (2013.01); *H04L 41/044* (2013.01)

(58) Field of Classification Search
CPC .............................. H04L 41/16; H04L 41/044
(Continued)

(56) References Cited

U.S. PATENT DOCUMENTS

2008/0032677 A1\* 2/2008 Catovic ............... H04W 72/085
455/414.1
2015/0370227 A1 12/2015 Bassily et al.
(Continued)

FOREIGN PATENT DOCUMENTS

WO 2018068857 A1 4/2018

OTHER PUBLICATIONS

International Search Report and the Written Opinion of the International Searching Authority, issued in corresponding International Application No. PCT/IB2019/051584, dated Nov. 14, 2019, 20 pages.
(Continued)

*Primary Examiner* — Adnan M Mirza
(74) *Attorney, Agent, or Firm* — Rothwell, Figg, Ernst & Manbeck, P.C.

(57) ABSTRACT

A framework for transfer learning for radio resource management-related tasks in radio access networks is defined in terms of functional entities of the network operator and associated signaling. A source learner (110) provides parameters or policies that incorporate knowledge related to another context than the actual context in which the RRM-related task is to be executed. A target learner (120) converts the source policies and parameters into models or target policies relevant to the actual context of the RRM-related task. An actor (130) receiving target learner's output is enabled to determine an RRM-related action for accomplishing the RRM-related task.

20 Claims, 11 Drawing Sheets

(58) Field of Classification Search
USPC .................................................... 709/224
See application file for complete search history.

(56) References Cited

U.S. PATENT DOCUMENTS

2016/0021173 A1   1/2016   Tapia
2019/0025917 A1   1/2019   Francis et al.
2019/0350023 A1*  11/2019  Novlan ............... H04W 56/004

OTHER PUBLICATIONS

Zhao Qiyang et al. "Agent transfer learning for cognitive resource management on multi-hop backhaul networks", 2013 Future Network & Mobile Summit, Authors, Jul. 3, 2013 (Jul. 3, 2013), p. 1-10, XP032506898.

Baxter "A Model of Inductive Bias Learning" Journal of Artificial Intelligence Research 12 (2000) 149-198.

Shi et al. "Actively Transfer Domain Knowledge" ECML PKDD 2008, Part II, LNAI 5212, pp. 342-357, 2008.

Lazaric "Transfer in Reinforcement Learning: a Framework and a Survey" Marco Wiering, Martijn van Otterlo. Reinforcement Learning—State of the art, 12, Springer, pp. 143-173, 2012.

Calabrese et al. "Learning Radio Resource Management in RANs: Framework, Opportunities, and Challenges" IEEE Communications Magazine, Sep. 2018, pp. 138-145.

Carroll et al. "Task Similarity Measures for Transfer in Reinforcement Learning Task Libraries" Brigham Young University BYU Scholars Archive, Proceedings of International Joint Conference on Neural Networks, Montreal, Canada, Jul. 31-Aug. 4, 2005, pp. 803-808.

Torrey et al. "Transfer Learning" University of Wisconsin, Madison WI, USA, 2009, 22 pages.

Taylor et al. "Transfer Learning for Reinforcement Learning Domains: A Survey" Journal of Machine Learning Research 10 (2009) 1633-1685.

O'Shea et al. "An Introduction to Deep Learning for the Physical Layer" IEEE Transactions on Cognitive Communications and Networking, vol. 3, No. 4, Dec. 2017, pp. 563-575.

* cited by examiner

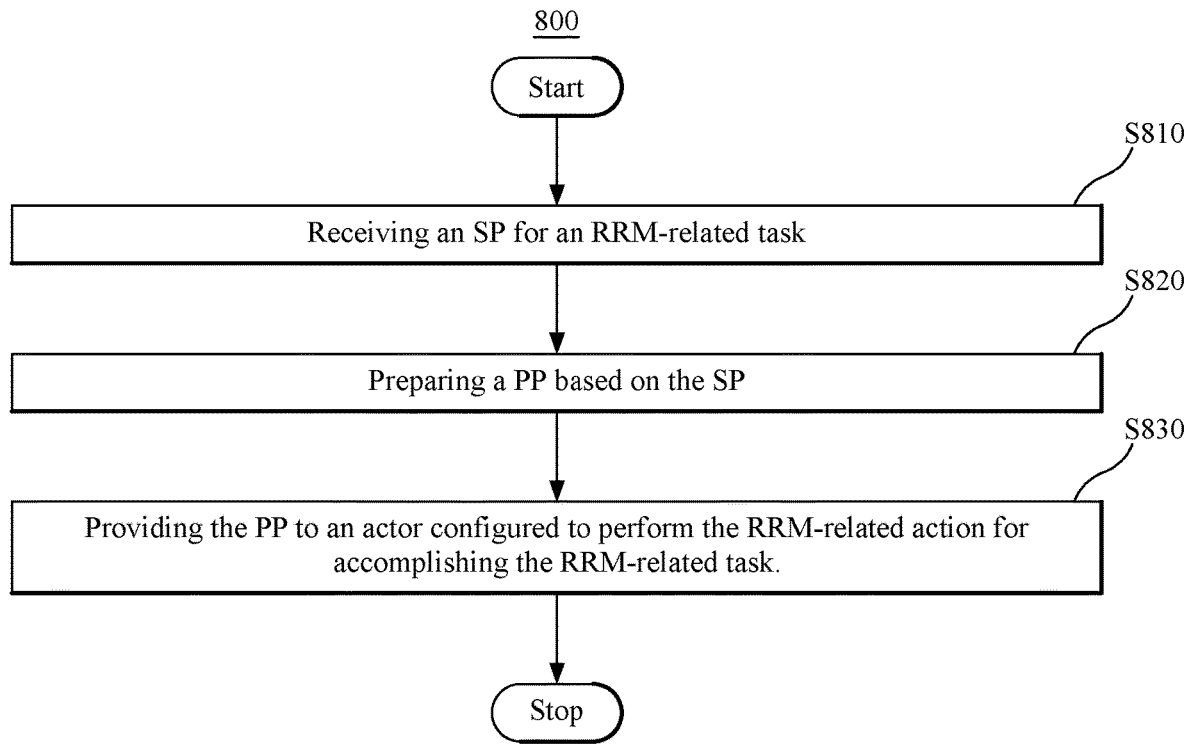
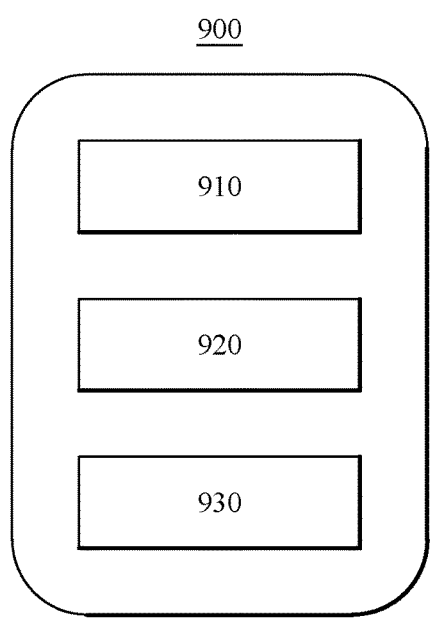

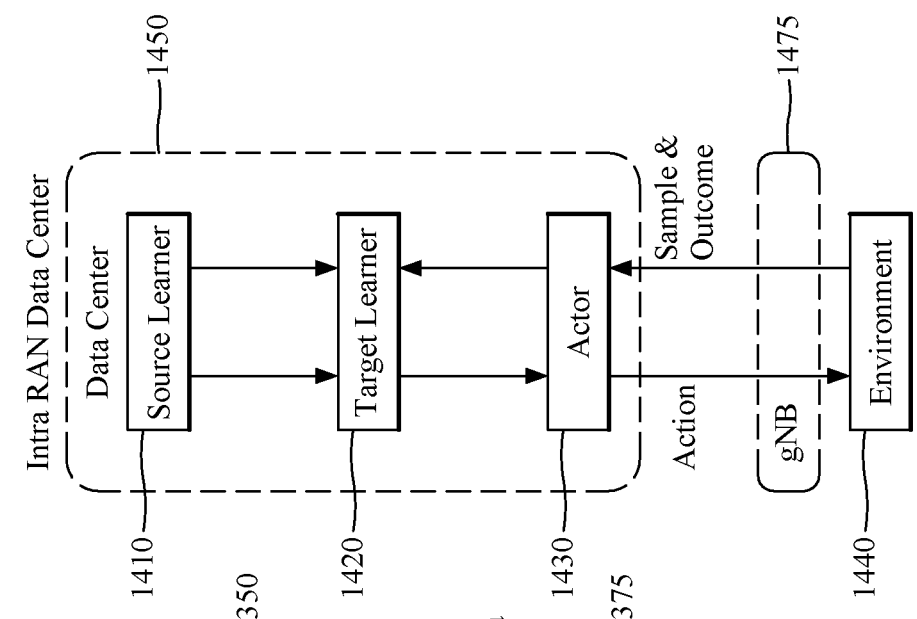
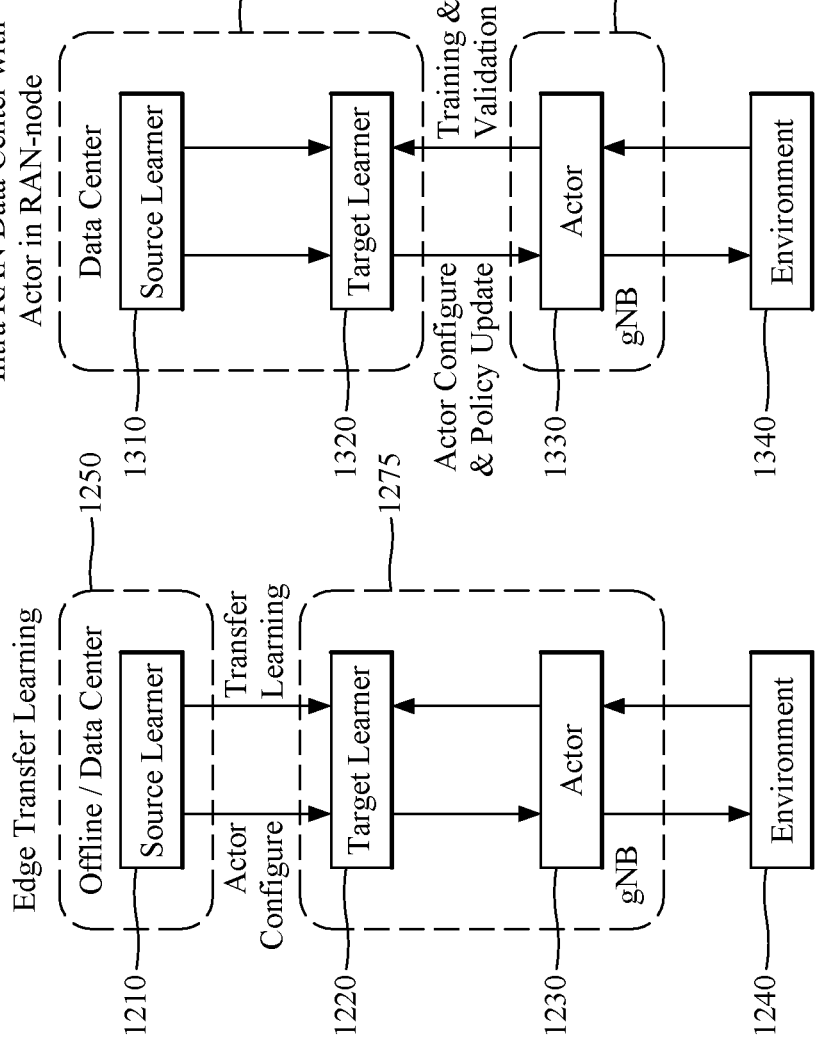

TRANSFER LEARNING FOR RADIO RESOURCE MANAGEMENT

CROSS REFERENCE TO RELATED APPLICATION(S)

This application is a 35 U.S.C. § 371 National Phase Entry Application from PCT/IB2019/051584, filed Feb. 27, 2019, designating the United States, the disclosure of which is incorporated herein by reference in its entirety.

TECHNICAL FIELD

Embodiments of the subject matter disclosed herein relate to transfer learning (TL) and reinforcement learning (RL) radio resource management-related (RRM-related) tasks in radio access networks (RANs). More specifically, the various embodiments set forth a framework for TL (i.e., entities and signaling mechanisms) and adaptive TL for RRM-related actions.

BACKGROUND

Reinforcement learning (RL) in RRM refers to helping an actor entity that controls an RRM feature in a RAN to make suitable decisions by effectively using data such as measurements. RL accelerates an actor entity's transition from an initial phase when it starts operating to a suitable state in which it produces performant RRM-related decisions. Conventionally, this transition requires time-consuming training during which the logic (knowledge) of the actor entity improves by learning from its own interactions with the RAN.

Transfer learning (TL) is a term that encompasses techniques for transferring the logic (knowledge) gather from a first actor toward a second actor so that the second actor can produce suitable decisions faster than the second actor would have learned from its own experience.

Recently, machine learning (ML) techniques using models and inferences to automatically perform specific tasks without using explicit instructions has stirred RAN developers' interest. Advanced ML techniques may overcome the difficulty of expressing complex communication scenarios (e.g., unknown channel models) or complex interdependent subcomponents using models and inferences.

The article, "An Introduction to Deep Learning for the Physical Layer," by T. O'Shea and J. Hoydis, in *IEEE Transactions on Cognitive Communications and Networking*, Vol. 3, No. 4, December 2017, pp. 563-575, describes several physical layer scenarios where a deep inductive learning framework could be successful. In a transceiver, the transmitter, the channel and the receiver are modeled using a neural network and trained as autoencoders to then be used in situations where the true distribution of the underlying channels is unknown and existing classical methods are not able to perform adequately.

The article, "Learning Radio Resource Management in 5G Networks: Framework, Opportunities and Challenges," by F. D. Calabrese et al., published in *IEEE Communications Magazine*, September 2018, pp. 138-145, described an RL framework that consists of an actor and trainer (i.e., logical entities) within RANs. While trainers are responsible for generating control algorithms (policies in the RL context), actors execute policies issued by trainers in a distributed fashion interacting with the environment (i.e., the RAN). Traditionally, different RRM problems were solved with dedicated algorithms, with each algorithm being able to optimize one specific RRM-related task. The method in Calabrese's article proposes a generic architecture for reusing a single RL algorithm to produce control policies (possibly trained on different data sets) for different RRM tasks. The article describes testing this framework for two RRM-related tasks (i.e., a downlink power control and a transmission/reception point selection in a 4G single frequency network) using a sub-6 GHz event-driven system simulator.

The international patent application PCT/EP2016/074617 (published as WO 2018/068857 A1) by F. D. Calabrese et al. describes an RL architecture in the context of RRM in RANs. In this context, a configurable RRM parameter of a radio cell (e.g., a threshold value for performing cell handover, downlink transmission power, assignment of a time-frequency resource block, etc.) is controlled by using a single RL method. This patent application addresses the implementation aspects of the actors and training center, as well as the signaling mechanisms between the entities using standard RAN interfaces, the framework being the one set forth in Calabrese's article.

Reusing the same RL method to produce different RRM policies as considered in Calabrese references is a first step in generalizing the learning in the RAN context. A second step is to be able to generalize learning across different policies (tasks). The section, "Transfer Learning," by L. Torrey and J. Shavlik in the *Handbook of Research on Machine Learning Applications*, IGI Global, 2009, edited by E. Soria, J. Martin, R. Magdalena, M. Martinez and A. Serrano, argues that TL is a technique for reusing knowledge learned from one (source) task to improve the learning efficiency of another (target) task relative to when the latter is learned only based on its own experience. Chapter 5, "Transfer in Reinforcement Learning: a Framework and a Survey," by A. Lazaric in the book, *Reinforcement Learning: State-of-the-Art*, edited by M. Wiering and M. van Otterlo, published by Springer, 2012, pp. 143-173, discusses transferring (a) different knowledge elements such as data samples, (b) policy variables such as value functions, (c) representation parameters such as weights of a neural network, (d) basic functions defining the hypothesis space, and (e) aggregated feature or state variables (i.e., options) across different source and targets.

Lazaric's survey and the article, "Transfer Learning for Reinforcement Learning Domains: A Survey," by M. E. Taylor and P. Stone, published in the *Journal of Machine Learning Research* 10, 2009, pp. 1633-1685, discuss the differences between source and target tasks in the RL domain. Several RL problems can be modeled as Markov decision problems (MDPs) characterized by parameters such as state, action, reward, and often unknown transition (probability density) functions that take a state and task pair and indicate the next state (or its probability). Identified RL task differences are mapped on different elements of MDPs. The source and target RL tasks may differ in transition functions, range of state variables (state space), type and number of variables describing the state (so-called features), reward functions, type and range of variables describing the task, etc.

Using TL in the RL domain makes possible performance improvements by using the learning parameters of a source task in order to jumpstart a target task (i.e., initializing the target task parameters by the ones of the source task yields better performance compared to a random initialization of target parameters). TL is intended to help the actor start from an acceptable performance, avoiding undesirable artifacts of a cold start (with a poor initial policy). Using TL may also increase learning speed (i.e., fewer training data samples are necessary) than when learning starts from scratch (default or random parameter values). Finally, TL improves the asymptotic rate of convergence so the target RL algorithm reaches stable performance in a reasonable time.

A complete survey of methods and techniques relevant for TL in RL domain together with performance gain scenarios are presented in Taylor and Stone's survey. Some undesirable effects such as negative transfer may occur in TL. One way to avoid such effects is by using more complex source task selection methods. The article, "Task similarity measures for transfer in reinforcement learning task libraries," by J. Carroll and K. Seppi, published in *Proceedings of 2005 IEEE International Joint Conference on Neural Networks*, proposes using general task similarity metrics to enable robust transfer. None of the metrics are always the best because in the complex environment of the RAN it is unlikely that a single task can be identified to be the best to serve as source. Moreover, since the nature of the RAN environment typically changes over time (e.g., from low UE density or traffic to high UE density), it can be foreseen which specific one from a set of RL tasks serving as sources for TL is the best to change over time.

Although principles of TL in RL domain and associated performance-gain promises have been articulated in literature, the specific details of applying TL in RANs are largely unaddressed. Conventional techniques for solving a specific RRM task do not render the associated methods reusable for other RRM tasks. Conventional frameworks do not support generalization across different tasks. Additionally, the issue of transferring the source RL solution (e.g., trained policies, representation parameters, etc.) for a given RRM task to another RRM target task is not resolved.

To summarize, conventional approaches do not address all the implementation aspects of the TL in RANs and do not provide for transferring algorithmic parameters across different RL tasks residing on different network units, in a structured manner, so as to make the parameters usable by a target learning task. Moreover, conventional approaches do not address signaling across different RAN-nodes involved in TL.

Performance benefits of TL in RL heavily rely on selecting the right (best or at least good) source, tuning learning parameters of a target task based on a source task, etc. Moreover, RAN conditions (e.g., user's density, traffic load, interference, etc.) change constantly over time, which can render an RL solution (a.k.a. policy) which is good (best) at one moment to become bad (suboptimal) at a later moment. RAN conditions are difficult to predict before transferring a policy. Therefore, a negative transfer is a danger for real network implementation of TL. Conventionally, adaptive TL is not possible and negative transfer is not prevented.

Abbreviations used in this document and their explanations are listed below:
BLER Block Error Rate
gNB next generation NodeB
KPI Key Performance Indicator
MDP Markov Decision Process
ML Machine Learning
PP Production Policy
RAN Radio Access Network
RAT Radio Access Technology
RL Reinforcement Learning
RRM Radio Resource Management
RSRP Reference Signal Received Power
RSRQ Reference Signal Received Quality
SINR Signal to Interference plus Noise Ratio
SP Source Policy
TA Timing Advance
TL Transfer Learning
TP Target Policy
UE User Equipment

SUMMARY

The TL and RL framework used for RRM-related tasks set forth in various embodiments includes network operator entities and associated signaling. These entities may be incorporated into existing or future standard RAN functions and signaling may be mapped into respective RAN interfaces. The framework is generic in the sense that it can be reused by multiple RL algorithms to optimize performance for different RRM-related tasks.

RL policies are the algorithmic logic for making decisions related to an RRM-related task for controlling an RRM feature. One or more source RL policies prepared and optionally updated (e.g., via retraining) are transferred to a target learner. Different policies perform well in different network situations (e.g., characteristics of the RAN-node running the RL algorithm, number of users, amount of traffic, interference experienced at a RAN node posed by other parts of the RAN, etc.). The target learner can use the source policies selectively depending on information gained by executing the RRM-related task in the RAN. In order to avoid negative transfer, the target learner may also maintain a basic non-transferred RL policy (e.g., an ML model with parameters not initialized by received source policies). The target learner transfers one policy adaptively selected from a set of different RRM algorithms to the actor depending on the real situation of RANs.

According to an embodiment, there is a network operator device performing as a source for policies related to RRM in a RAN. The network operator device has a communication interface configured to intermediate data exchange with a target learner in RAN, and a data processing unit connected to the communication interface. The data processing unit is configured to prepare and supply a source policy, SP, for an RRM-related task, via the communication interface to the target learner, wherein the target learner is thus enabled to provide a production policy, PP, to an actor that determines an RRM-related action for accomplishing the RRM-related task.

According to another embodiment, there is a method for a network operator device performing as a source for policies related to RRM in a RAN. The method includes preparing an SP for an RRM-related task in RAN, and supplying the SP to a target learner. The target learner is thus enabled to provide a production policy, PP, to an actor that determines an RRM-related action for accomplishing the RRM-related task.

According to yet another embodiment, there is a computer readable recording medium storing executable codes that, when executed on a network operator device, makes the network operator device to perform as a source learner for policies related to RRM in a RAN, the network operator device preparing and supplying an SP for an RRM-related task to a target learner. The target learner is thus enabled to provide a PP to an actor that determines an RRM-related action for accomplishing the RRM-related task.

According to yet another embodiment, there is a program product causing a network operator device to perform as a source for policies related to RRM in a RAN. The program product makes the network operator device to prepare and supply an SP for an RRM-related task to a target learner. The target learner is thus enabled to provide a PP to an actor that determines an RRM-related action to accomplish the RRM-related task.

According to another embodiment, there is a network operator device performing as a source learner in a RAN. The network operator device has a first module configured to prepare an SP for an RRM-related task, and a second module configured to transmit the SP to the target learner, the target learner being thus enabled to provide a PP to an actor that determines an RRM-related action to accomplish the RRM-related task.

According to an embodiment, there is a network operator device performing as a target learner for policies related to RRM in a RAN. The network operator device has a communication interface configured to intermediate data exchange with a source, and an actor that determines an RRM-related action to accomplish the RRM-related task. The network operator device also has a data processing unit connected to the communication interface and configured to receive an SP for the RRM-related task from the source, prepare a PP based on the SP, and provide the PP to the actor via the communication interface. The actor is thus enabled to determine an RRM-related action to accomplish the RRM-related task.

According to another embodiment, there is a method for a network operator device performing as a target learner for policies related to RRM in a RAN. The method includes receiving an SP for an RRM-related task, preparing a PP based on the SP and providing the PP to an actor configured to determine an RRM-related action for accomplishing the RRM-related task.

According to yet another embodiment, there is a computer readable recording medium storing executable codes that, when executed on a network operator device, makes the network operator device to perform as a target learner for policies related to RRM in a RAN. The network operator device receiving an SP for an RRM-related task and providing a PP based on the SP to an actor configured to determine an RRM-related action for accomplishing the RRM task.

According to another embodiment, there is program product causing a network operator device to perform as a target learner for policies related to RRM in a RAN. The program makes the network operator device to provide a PP for an RRM-related task based on a received SP, to an actor configured to determine an RRM-related action for accomplishing the RRM-related task.

According to yet another embodiment, there is a network operator device performing as a target learner in a RAN. The network operator device has a first module for receiving an SP for an RRM-related task in RAN, a second module for preparing a PP based on the SP and a third module for transmitting the PP to an actor configured to determine an RRM-related action for accomplishing the RRM-related task.

According to an embodiment there is a network operator device performing as an actor in a RAN. The network operator device includes a communication interface configured to intermediate communication with a target learner via the RAN and a data processing unit connected to the communication interface. The data processing unit is configured to receive a PP for an RRM-related task from the target learner, to determine an RRM-related action for accomplishing the RRM-related task, using the PP, and to provide feedback to the target learner.

According to another embodiment, there is a method for a network operator device performing as an actor in a RAN. The method includes receiving a PP for an RRM-related task from a target learner, determining an RRM-related action for accomplishing the RRM-related task, using the PP, and providing feedback to the target learner.

According to yet another embodiment, there is a network operator device performing as an actor in a RAN. The network operator device has a first module for receiving a PP for an RRM-related task, a second module for determining an RRM-related action for accomplishing the RRM related task and a third module for providing feedback.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a flowchart of a target learner method according to an embodiment;

FIG. 9 is a modular diagram of a network operator device operating as a target learner according to an embodiment;

FIGS. 12-14 illustrate deployment scenarios according to different embodiments;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
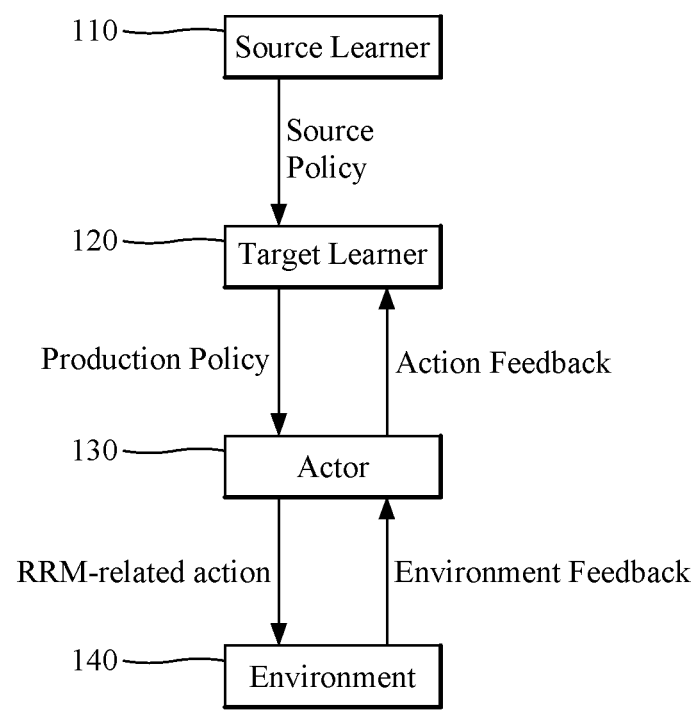
FIG. 1 is a block diagram illustrating TL and RL of RRM-related policies according to an embodiment.

A framework for TL and RL of RRM-related policies is set forth first using the block diagram in FIG. 1. The adaptive aspect is discussed later. Note that "source learner" and "source," "target learner" and "target," "actor" and "actor entity" are terms interchangeably used in this description. These entities are combinations of software and hardware configured to operate as described for the different embodiments.

In an RL setup, policies are algorithmic logic performed by an actor for determining the RRM-related action. In different entities, a policy receives as input information (experience samples) describing a history of a RAN's operations and an actor's interactions, including parameters and measurements describing current or past RAN status (e.g., RSRP, SINR, RSRQ, TA, resources assigned to a UE, etc., either in raw or aggregate format such as averages, median, variance, etc.) and the actor's past performed RRM-related actions. Then, the policy outputs either an RRM-related action to be performed by the actor, or an implicit quantity (e.g., a probability distribution, a certain type of state, or state-task value function) to be used by the actor to determine the action.

A source learner 110 is a logical entity that prepares, maintains and transfers one or more source policies to a target learner 120. A source policy (SP) is a policy that serves as a kick-starter for a target policy (TP). The SP is prepared based on information gathered from entities other than (but not excluding) actor 130.

The target learner 120 receives the SP and outputs a production policy (PP) to actor entity 130. Based on the received PP, actor entity 130 determines and performs an RRM-related action affecting environment 140 (i.e., at least one part of the RAN). Actor 130 may receive feedback from the environment, enabling it to assess the RRM-related action's effect, and may provide feedback to target learner 120. TL is employed in transferring SP and PP, and RL is employed by one or more of source learner, target learner and actor to update and enhance the policies based on feedback.

In some embodiments, a source learner may use a target policy received as feedback from a target learner as a source policy for some other target learner (possibly at some other parts of the network).

Table 1 lists examples of source and target policies.

TABLE 1

| | Source | Target |
|---|---|---|
| 1. | A policy for an RRM task or for a cell type | A policy for another RRM task or another cell type |
| 2. | A policy for an RRM task generated from data of multiple cells | A policy for the same RRM task in a specific cell |
| 3. | A policy for an RRM task generated from simulated data | A policy for the same task but using real network data |
| 4. | A policy trained using a high volume of correlated low-cost sources of data | A policy using less available, often more precise, high-cost data |

TABLE 1-continued

| | Source | Target |
|---|---|---|
| 5. | A policy trained by using offline available data | A policy to be run on the live network |
| 6. | A policy trained using 4G data or for 4G RRM features | A policy for 5G RRM features |

An example of RRM in item 1 of Table 1 is inter-cell interference coordination, and another RRM task therein may be downlink cell power control. In the same item 1 of Table 1, the radio technology may be for controlling a radio resource in a Macro cell, and the other radio technology may be for controlling the radio resource in a Pico cell. In item 4 of Table 1, an example of high volume of correlated low-cost sources of data is measurements usually collected during a RAN's operation, such as radio measurements indicating the signal strength and interference level. In item 4 of Table 1, an example of the less available, often more precise, high-cost data is measurements requiring a subscription to be collected, such as accurate positioning measurements for UEs.

Figure 2:
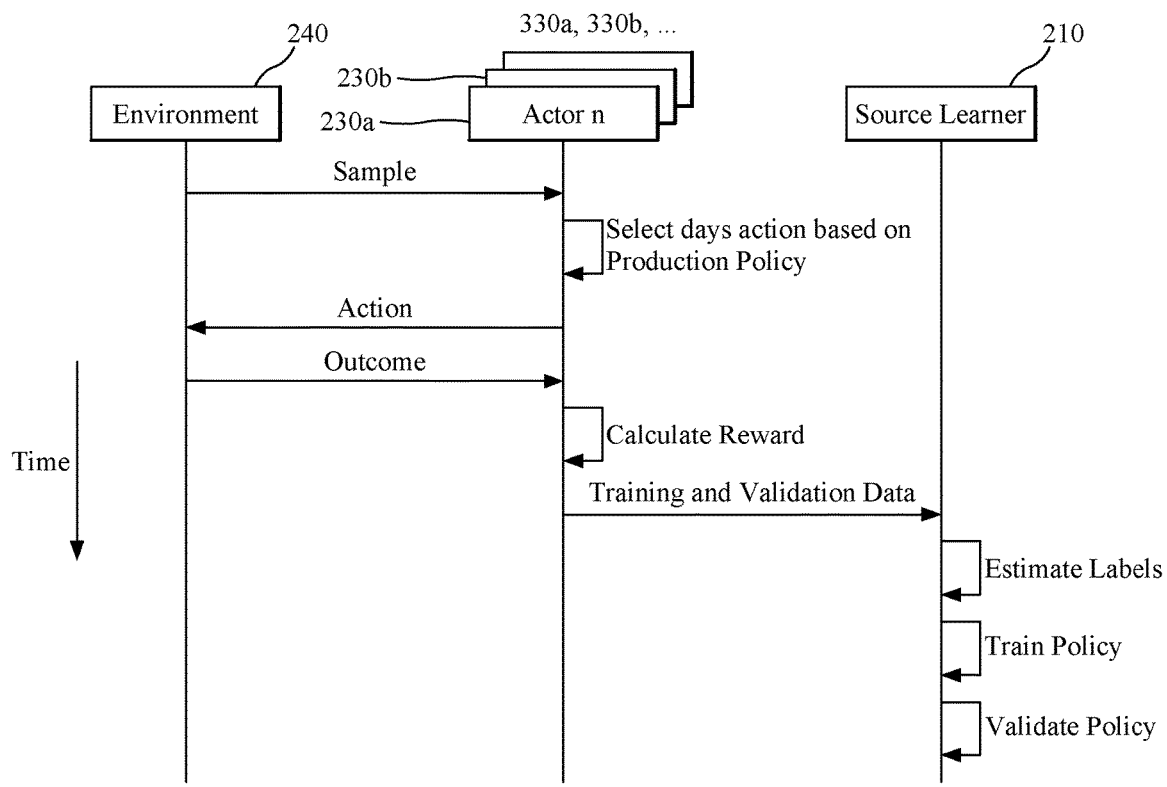
FIG. 2 illustrates a scenario in which the actor provides training and validation data to the source learner according to an embodiment.

In some cases, a source learner may train and/or validate source policies. For example, source learner 210 may update a generic policy for a set of radio cells based on information collected from one or more relevant actor entities 230*a*, 230*b*, etc., as illustrated in FIG. 2. Note that in FIG. 2 as well as in other figures that illustrate sequences of steps, time flows from top to bottom. The training and validation data provided by the actor entities may incorporate the feedback they received from environment 240 and/or rewards they calculate. A target entity which would be labeled 220 is not shown in FIG. 2.

In some embodiments, the source learner also sends an actor configuration, which may include parameters related to exploration strategy to be employed by the actor entity. Exploration strategy defines the manner in which the actor entity chooses the RRM-related action from plural possible RRM-related actions to explore the action space. An exploration strategy can be seen as a probability distribution function over the possible RRM-related actions. It can be entirely independent from a current state of environment and actor's policy (e.g., random exploration), dependent on actor's policy and a random function (e.g., epsilon Greedy) or dependent on actor's policy and the current state of the environment.

In other words, exploration enables the actor to acquire a fresh view about an unknown environment in which it operates. Exploration is different from exploitation that mainly refers to the actor determining the RRM-related action based on a policy (i.e., the actor chooses the task considered best based on the actor's knowledge gained through prior engagement with the environment). Both exploration and exploitation are important steps for an RL actor to choose an action that solves the RRM-related task successfully.

The source may send the actor configuration directly to the actor. In some embodiments, the source policies and/or the actor's configuration are transferred indirectly from the source learner to the target learner or the actor (i.e., are first transferred to another intermediate network device such as a network control unit).

Figure 3:
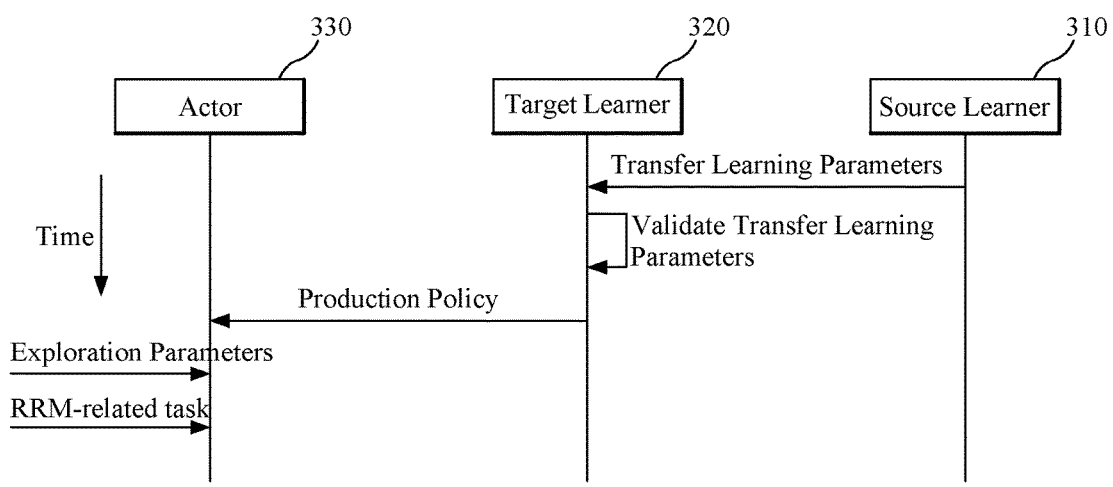
FIG. 3 illustrates a scenario in which the target learner validates transfer learning parameters received from the source learner according to an embodiment.

Target learner 120 in FIG. 1 is an entity responsible for receiving source policies and other parameters (sometimes collectively called transfer learning parameters) from source learner 110. FIG. 3 shows target learner 320 receiving transfer learning parameters from source learner 310. The transfer learning parameters may include structure and weights of a neural network, a decision forest, etc. Target learner 320 validates the received source policy (or policies) according to some suitable criteria. Target learner 320 then sends a production policy to actor 330. Actor 330 then determines an RRM-related action using (a) the production policy and (b) exploration parameters received from the environment.

In some embodiments, a target learner may maintain and improve a received source policy, for example, by progressively updating it via training. The target learner may use for training information describing a history of network and actor interactions (e.g., measurements describing current or past network states, actor's decisions in determining the RRM-related action, information regarding the probability of different versions of the RRM-related action, feedback actors receive from the environment in response to performing RRM-related action (e.g., suitable reward or cost functions constructed from key performance indicators, KPI, and performance measurements such as spectral efficiency, throughput, acknowledgment received upon delivery of data packets, etc.). The information used for training and validating target policies may be received from an actor either at once or in series of smaller batches. In some embodiments, the target learner may receive similar information from another entity (e.g., a logger unit).

Training may be performed using suitable methods involving one or more machine learning models (e.g., artificial neural networks, decision forests, support vector machines, etc.) and numerical optimization algorithms (e.g., variants of gradient descent, Broyden-Fletcher-Goldfarb-Shanno, higher order methods such as Newton).

In some embodiments, a target learner may send a request to receive an actor's running policy. The running policy may be the production policy improved using RL by the actor. The target learner may then use the running policy for validating or retraining its policies using some suitable criteria. The target learner may validate a policy using information describing a history of network and actor's interactions received from the actor. Although this is the same type of information as that used in training, a separate set of data (which has not been previously used for training) is usually reserved for validation.

Figure 4:
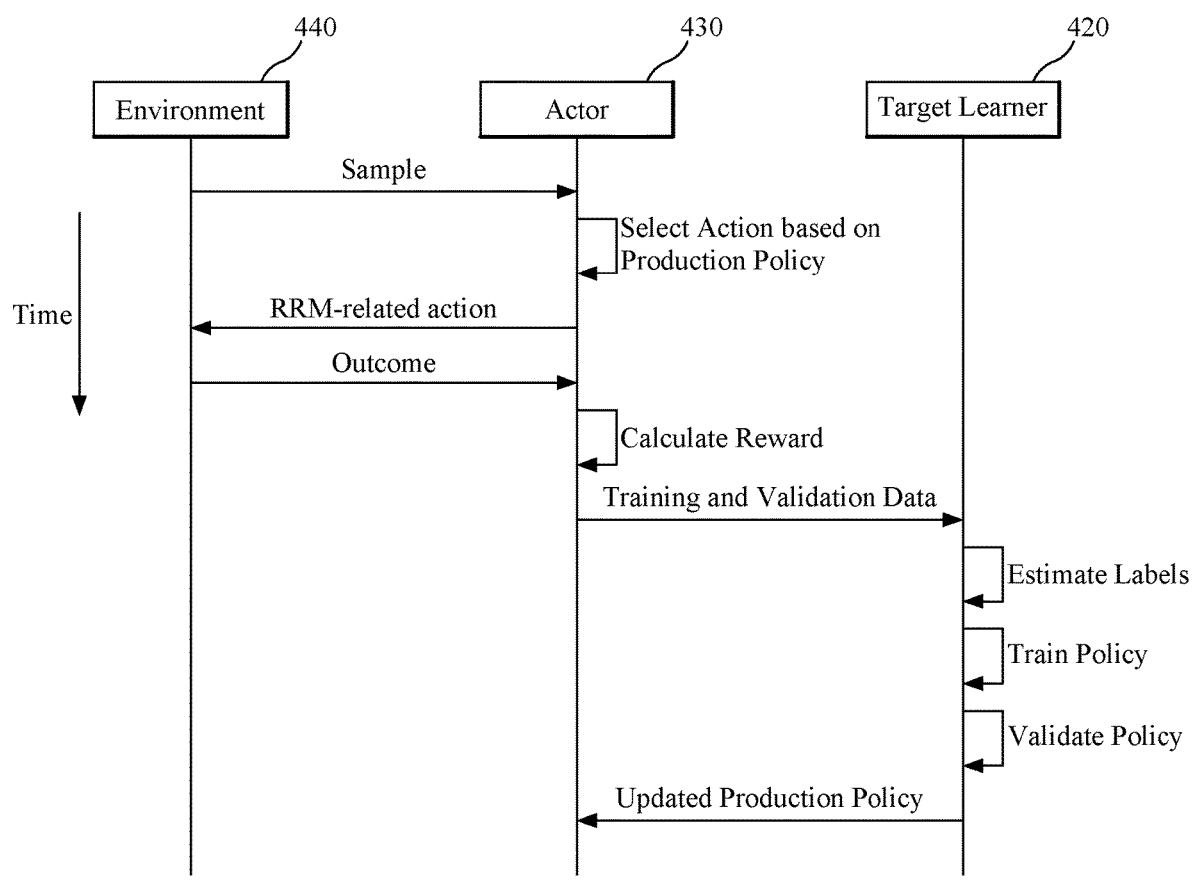
FIG. 4 illustrates a scenario in which the target learner updates the production policy based on feedback received from the actor according to an embodiment.

Returning again to FIG. 1, target learner 120 sends a production policy (PP) to actor 130. The PP may be a policy as received from the source learner, may be a version of a source policy refined by further training, and it may be a validated policy. In some embodiments, the target learner may also send an actor configuration (e.g., exploration parameters) to the actor. FIG. 4 illustrates a scenario in which a target learner 420 uses an ML technique and actor's feedback (i.e., training and validation data) to update the production policy and resubmit it to actor 430. Actor 430 provides the training and validation data in view of feedback it receives from environment 440. Note that a source learner which would be labeled 410 is not shown in FIG. 4.

In some embodiments, a target learner may send a policy to the source learner to be used as a source policy in some other part of the network.

An actor (as any of 130, 230, 330, 430) is a logical entity that interacts at least with the target learner and the environment (optionally, with the source learner, too). The actor receives information from the environment indicating a current or past status of the network. Such information may be in the form of network measurements and KPIs (e.g., RSRP, SINR, RSRQ, TA, resources assigned to a UE, throughput, spectral efficiency, etc.) either raw data or in aggregate form (such as averages, median, sum, max, min, variance, standard deviation, etc.). The actor determined an RRM-related action based on the information received from the environment, a production policy and/or an exploration strategy. In some embodiments, the actor determines the RRM-related action by sampling from the probability distribution provided by the production policy and/or exploration strategy.

The RRM-related action may suitably be defined, for example, as increasing or decreasing, selecting or setting a target value for one or more tunable RRM parameters (e.g., link adaptation parameters such as certain BLER targets, downlink or uplink transmit power budget, time-frequency-space resource allocation variables, handover threshold, beam selection variable, etc.). The RRM-related action is transmitted to the environment (RAN).

In some embodiments, prior to outputting the RRM-related action, the actor preselects a subset of feasible actions based on information regarding current or past RAN status received from the environment. For example, adjusting a resource allocation variable is restricted once a predefined number of adjustments were performed or are about to have been performed. Moreover, the actor receives information from the environment as a feedback after an RRM-related action. The actor uses feedback information (e.g., various KPI and performance measurements such as spectral efficiency, throughput, acknowledgment received upon delivery of data packets, etc.) to construct suitable reward or cost functions.

In some embodiments, the actor stores a production policy received from the target learner in an internal memory. The actor may also validate the received policy and/or replace or update its running policy based on a received policy. The actor may provide its running policy upon receiving a request from the target learner.

An actor may receive some parameters related to exploration strategy either from the source learner or from another network entity (e.g., a network control unit). In this case, the actor may perform calculations to validate the received parameters and may update or replace its exploration strategy in view of these parameters.

In some embodiments, an actor records its interactions with the environment (i.e., information such as state, task, reward, probability of chosen task according to exploration strategy, etc.) in some suitable format. This information may be collected and/or calculated at different moments and may be used later for training and validation purposes or provided as feedback to the target learner and/or source learner or to an additional entity (e.g., a logging unit) at predetermined moments or, more likely, asynchronously. The additional entity may group different pieces of information (e.g., status of the network, an RRM-related action and the corresponding reward/cost value) together and send the grouped information further to the target learner and/or the source learner in a suitable manner. In some cases, an actor may send additional data such as unique keys together with recoded data to the additional entity to facilitate grouping the information pieces.

An actor may reside in an eNB/gNB that controls one or more co-located or non-co-located cells. In the latter case, communications between the actor and remote radio units use suitable intra-RAN interfaces.

Last but not least, returning yet again to FIG. 1, environment 140 (also 240 and 440 in FIGS. 2 and 4 respectively) is another logical entity representative of the TL and RL in a RAN (which is a real physical network or a simulator). The environment receives the RRM-related actions from the actor (or an intermediate network entity controlled by the actor) and returns feedback. The feedback is usually in the form of samples of a specific physical quantity measurable within a cellular network (such as received signal strength, data reception and transmission rate, success or failure of data packet reception, etc.).

The logical entities schematically illustrated in FIG. 1 form a TL framework for RRM-related tasks in the context of a RAN. The functionality of each entity may be split further into smaller entities (for example, in order to achieve refined design purposes such as modularization) without compromising the overall functionality as described. For example, training functionality may be a module separate from the rest of the functionalities within a target (or source) learner. Conversely, source and target learner may be merged into one entity, which outputs policies that incorporate knowledge gathered from other RAN entities besides actor-related experience.

Figure 5:
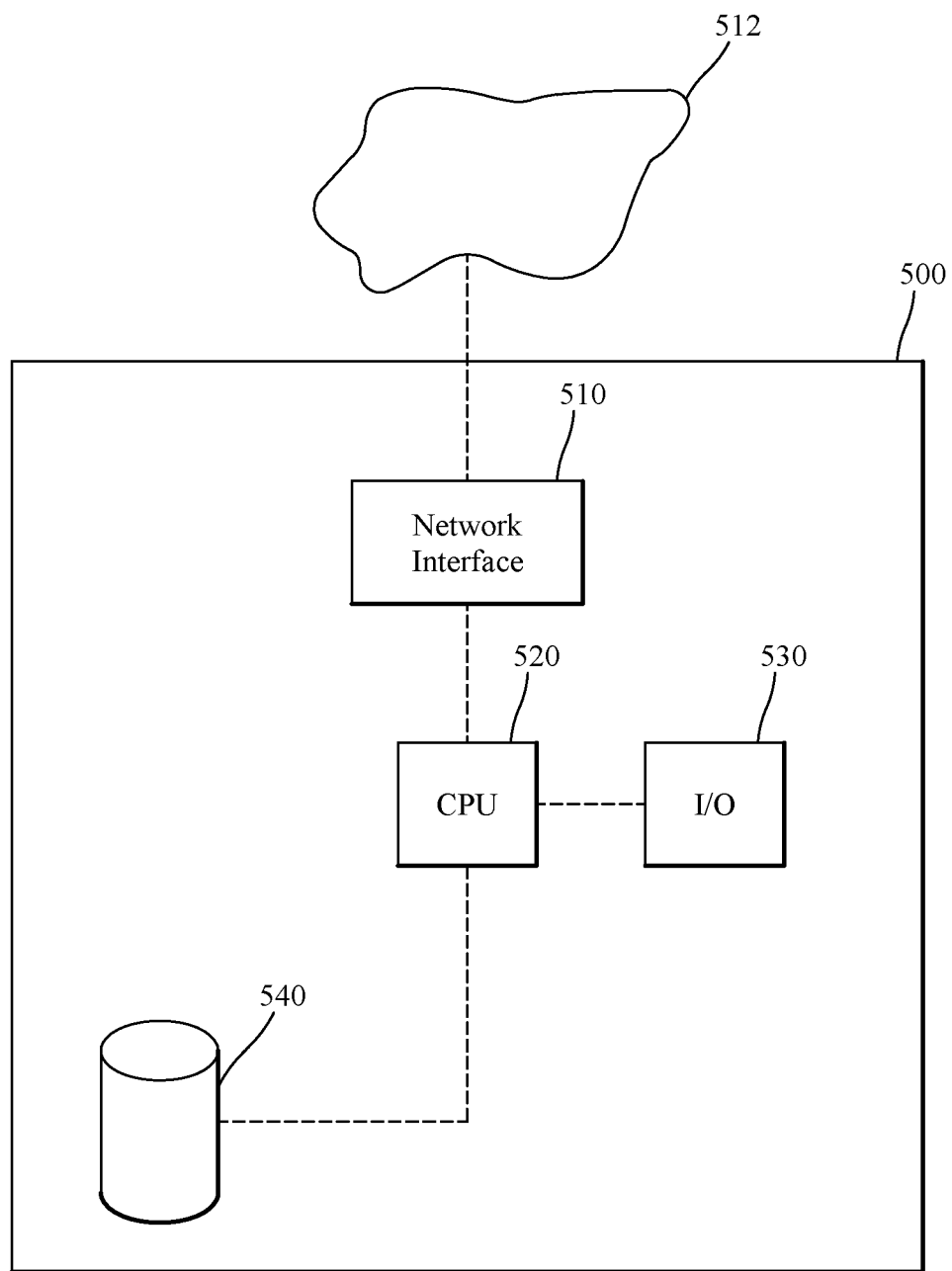
FIG. 5 is a block diagram of an apparatus usable as a network operator device according to an embodiment.

The various embodiments of the source learner, the target learner and the inference entity are a combination of hardware and software. FIG. 5 illustrates an apparatus 500 used as a network operator device providing hardware support to software, making it operate as a source learner, a target learner and/or an actor. Network operator devices are hardware operated to provide services to RAN clients (i.e., UEs). Apparatus 500 communicates with RAN 512 via an interface 510. The various operations related to a source learner's, target learner's and/or actor entity's functionality are performed by data processing unit 520 including one or more processors. Optionally, a separate I/O interface 530 enables interaction with a programmer. Apparatus 500 may include a data storage unit 540 that may store (1) executable codes making the data processing unit 520 execute various TL and RL techniques to provide RRM-related policies or tasks and/or (2) other policies, data, parameters, etc.

According to an embodiment, apparatus 500 is a network operator device performing as a source learner. When apparatus 500 operates as a source learner, communication interface 510 is configured to intermediate data exchange with a target learner, and data processing unit 520 is configured to prepare and supply a source policy, SP, for an RRM-related task, via the communication interface to the target learner. The target learner is thus enabled to provide a production policy, PP, to an actor that determines an RRM-related action to accomplish the RRM-related task.

Figure 6:
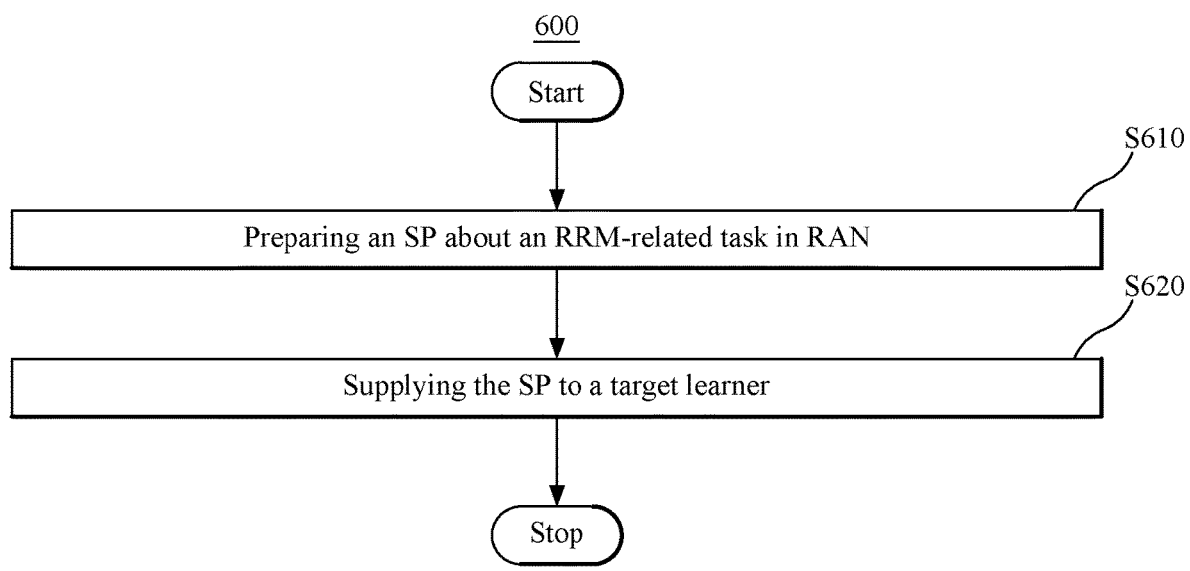
FIG. 6 is a flowchart of a source learner method according to an embodiment.

FIG. 6 is a flowchart of a method 600 performed by a network operator device performing as a source for policies related to RRM. Method 600 includes preparing an SP for an RRM-related task in RAN at S610 and supplying the SP to a target learner at S620. The target learner is thus enabled to provide a PP to an actor that determines an RRM-related action for accomplishing the RRM-related task.

Figure 7:
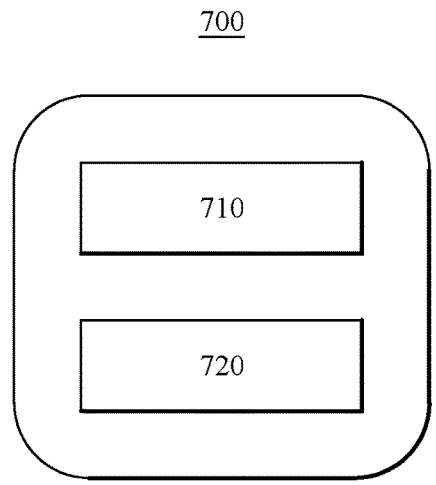
FIG. 7 is a modular diagram of a network operator device operating as a source learner according to an embodiment.

FIG. 7 is a block diagram of a network operator device 700 performing as a source learner for policies related to RRM according to another embodiment. The network operator device 700 includes a first module 710 configured to prepare an SP for an RRM-related task and a second module 720 configured to transmit the SP to the target learner, which is thus enabled to provide a PP to an actor that determines an RRM-related action for accomplishing the RRM-related task. These modules are combinations of software and hardware. For example, the first module includes a memory storing knowledge gathered from RRM-related actions of actors other than the actor and, optionally, also feedback from the actor's previous experience. Similarly, the second module may include a transceiver usable to transmit the SP.

According to another embodiment, apparatus 500 is a network operator device performing as a target learner. When apparatus 500 operates as a target learner, communication interface 510 is configured to intermediate data exchange with a source of policies and an actor configured to determine an RRM-related action. Data processing unit 520 is configured to receive an SP for an RRM-related task, via the communication interface to the target learner, and to provide a PP based on the SP to the actor, which is thus enabled to determine the RRM-related action for accomplishing the RRM-related task.

FIG. 8 is a flowchart of a method 800 performed by a network operator device performing as a target learner for policies related to RRM in RAN. Method 800 includes receiving an SP for an RRM-related task, at S810, preparing a PP based on the received SP at S820, and providing a PP based on the SP to an actor configured to determine an RRM-related action for accomplishing the RRM-related task, at S830.

FIG. 9 is a block diagram of a network operator device 900 performing as a target learner for policies related to RRM according to another embodiment. The network operator device 900 includes a first module 910 for receiving an SP, a second module 920 for preparing the PP based on the SP, and a third module 930 for transmitting the PP to an actor, which is thus enabled to determine an RRM-related action. Modules 910, 920 and 930 are combinations of software and hardware. For example, the first module may include a receiver configured to receive the SP from the source learner, the second module may include a memory storing information and/or executable codes used to prepare the PP, and the third module may include a transmitter usable to transmit the PP to the actor.

According to another embodiment, apparatus 500 is a network operator device performing as an actor entity configured to determine an RRM-related action. In this case, communication interface 510 is configured to intermediate data exchange with a target learner and environment. Data processing unit 520 is configured to receive a PP from the target learner, to determine an RRM-related action and to provide feedback to the target learner.

Figure 10:
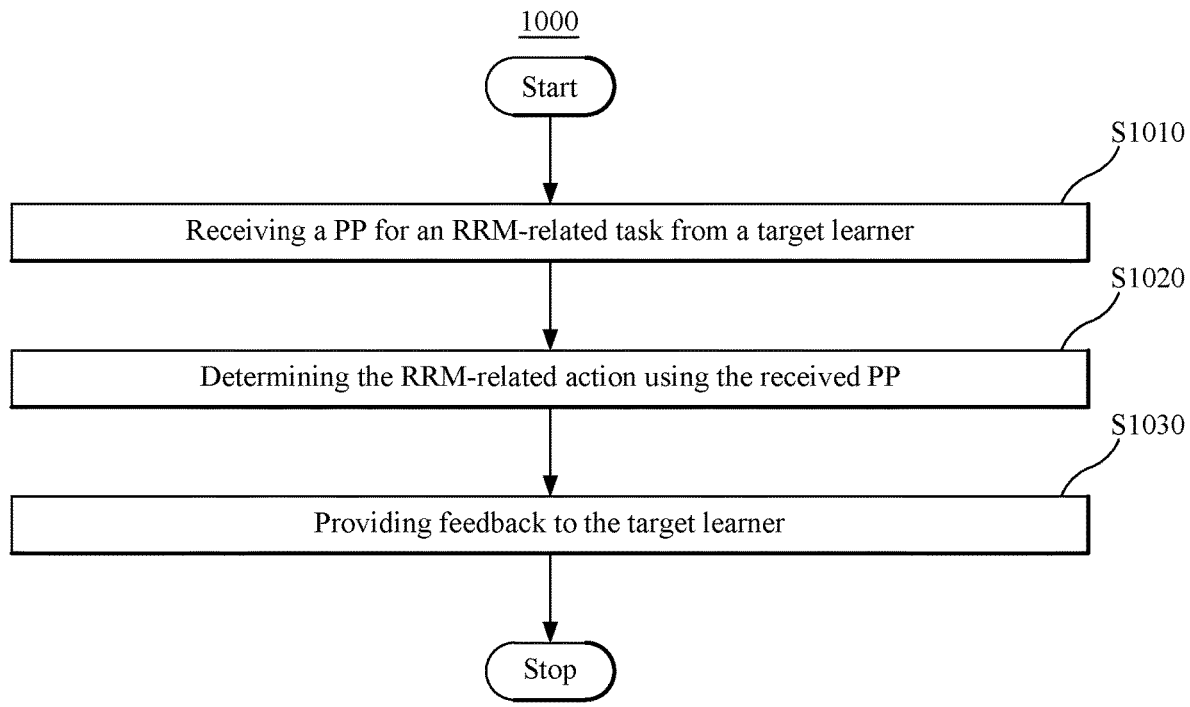
FIG. 10 is a flowchart of an actor method according to an embodiment.

FIG. 10 is a flowchart of a method 1000 performed by a network operator device performing as an actor in RAN. Method 1000 includes receiving a PP for an RRM-related task from a target learner, at S1010, determining an RRM-related action using the received PP at S1020, and providing feedback to the target learner, at S1030.

Figure 11:
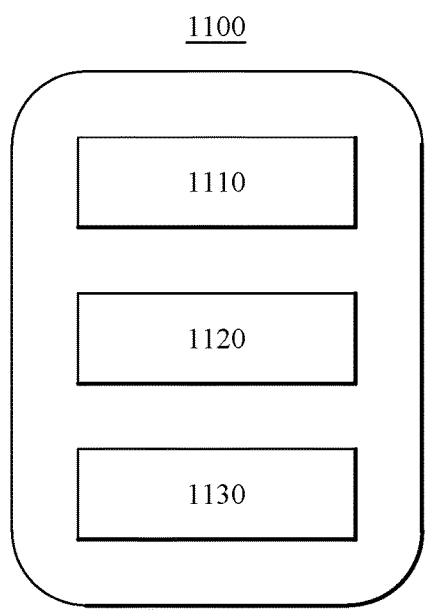
FIG. 11 is a modular diagram of a network operator device operating as an actor entity according to an embodiment.

FIG. 11 is a block diagram of a network operator device 1100 performing as an actor according to another embodiment. The network operator device 1100 includes a first module 1110 for receiving a PP for an RRM-related task, a second module 1120 for determining an RRM-related action using the received PP, and a third module 1130 for providing feedback to the target learner. Modules 1110, 1120 and 1130 are combinations of software and hardware. For example, the first module may include a receiver configured to receive the PP from the target learner, the second module may include a memory storing information and/or executable codes used to determine the RRM-related action, and the third module may include a transmitter usable to transmit the feedback.

FIGS. 12-14 illustrate three deployment scenarios for the logical entities forming the TL framework. The different functionalities enable different levels of virtualization and can be mapped flexibly into various parts of a RAN. The mapping between the transfer learning entities and the network functions does not need to be one-to-one. Alternatively or additionally, one or more transfer learning entities can be mapped into one or more network functions.

FIG. 12 illustrates an edge TL scenario that divides the framework into source learner 1210 at a data center 1250 (which may be offline) whereas the rest of the framework is deployed in a RAN-node 1275 (e.g., gNB). The SPs then can be produced either offline using some suitable infrastructure (e.g., production environment) or provided by the data center in the RAN. As such, the TL parameters and actor configuration information are sent occasionally, possibly through software updates to the target learner 1220, which imposes modest overhead in terms of signaling and bandwidth. Note that in this case, target learner and/or actor 1230 functionalities may be hosted in generic multi-core or special purpose digital signal processing hardware, possibly in different layers (e.g., L1, L2, or L3).

FIG. 13 illustrates another TL scenario with source learner 1310 and target learner 1320 in a data center 1250 while the actor 1330 is deployed in a RAN-node 1375. There are different ways to implement data center functionality, such as cloud-based services with commodity hardware including CPUs and/or GPUs. The source and target learner functions can be flexibly implemented either in a central or distributed manner in cloud premises. Actor configuration information and production policy updates are sent to the actor at the RAN-node. The latter information is needed to be sent relatively more frequently than the former information (e.g., once per day compared to once per month). Training and validation data are sent from the RAN-node to a data center. Such information might be sent in batches and/or in a best-effort manner (i.e., not latency sensitive). Although messaging overhead of this deployment scenario is higher compared to the edge TL scenario, the computational burden on the RAN-nodes is smaller in this scenario because training is performed in the data center, RAN-nodes performing only inference. Moreover, in this scenario, TL functions are more flexible in terms of deployment compared to the edge TL scenario.

FIG. 14 illustrates a deployment scenario in which source learner 1410, target learner 1420 and actor 1430 are deployed in a data center 1450. These TL functions then enjoy maximum flexibility in terms of implementation and deployment. The source learner's, target learner's and actor's functionality can be deployed in either a central or distributed manner using cloud concepts. In this scenario, no training and inference is performed at RAN-node hardware. On the other hand, the actor sends the RRM-related action to a RAN node 1475 for execution. The frequency of such submissions depends on the RRM-related task and can vary between (for example) a couple of milliseconds (i.e., real time) to seconds or minutes. The RRM-related actions may be delayed due to data-center-to-node communications, and this may be an impediment for time-sensitive (i.e., near real-time, e.g., less than a second) RRM-related tasks. In this scenario, the information specifying the status of the environment (e.g., radio measurements describing the network's current state, such as RSRP, SINR, RSRQ, TA, etc.) and outcome of specific RRM-related action previously (e.g., network measurement and KPIs such as spectral efficiency, throughput, etc.) are also sent from RAN-node to data center. This information is sent in one or multiple messages and possibly at different moments. The actor residing at the data center is then responsible for collecting and matching such information together with other relevant information available in order to prepare data batches used for training. The signaling overhead and latency requirements in this TL scenario may be more demanding than for the scenarios illustrated in FIGS. 12 and 13.

The above-described embodiments make it possible to implement TL for RRM-related tasks, thereby harvesting the potential benefits of TL in the context of RL. If at least one feature in the RAN is implemented using RL (e.g., a link adaptation feature), then using TL yields substantial performance benefits compared to the conventional rule-based approach. One drawback of ML-based solutions is the large amount of unbiased data needed to train the models. In some cases, the relevant data is collected progressively as the learning algorithm is deployed in a real network. As a result, one expects relatively poor initial performance for the parts of the network (e.g., cells) where the machine learning feature is deployed. By using TL, it is possible to mitigate initial performance degradation by using knowledge acquired in other parts of a RAN (e.g., via another cell which is considered to be similar to the cell affected by the RRM-related task). Such similarity may be based on traffic type, UE numbers and mobility pattern, etc. Moreover, when using TL, high performance of the RRM-related task is achieved faster and using less data compared to conventional approaches where models must be trained from scratch. Further, achieving high performance may be accelerated asymptotically compared to conventional approaches (starting from default or random model and/or parameters, without the benefit of prior relevant knowledge).

Moreover, the above-described embodiments provide a structured way of deploying TL for RRM-related tasks, instead of different implementations for different RRM features. Reusing framework entities reduces implementation costs, improves development speed and efficiency, and makes it easier to test and debug TL features. Finally, having a TL framework makes it easy to improve the algorithmic aspects thereof, which yields performance gains on multiple use cases.

Adaptive Transfer Learning in Radio Resource Management

The embodiments described hereinafter enable adaptive TL policies and refer back to the entities (source and target learners, actor) already described relative to FIG. 1, but which are enriched by adaptivity.

Figure 15:
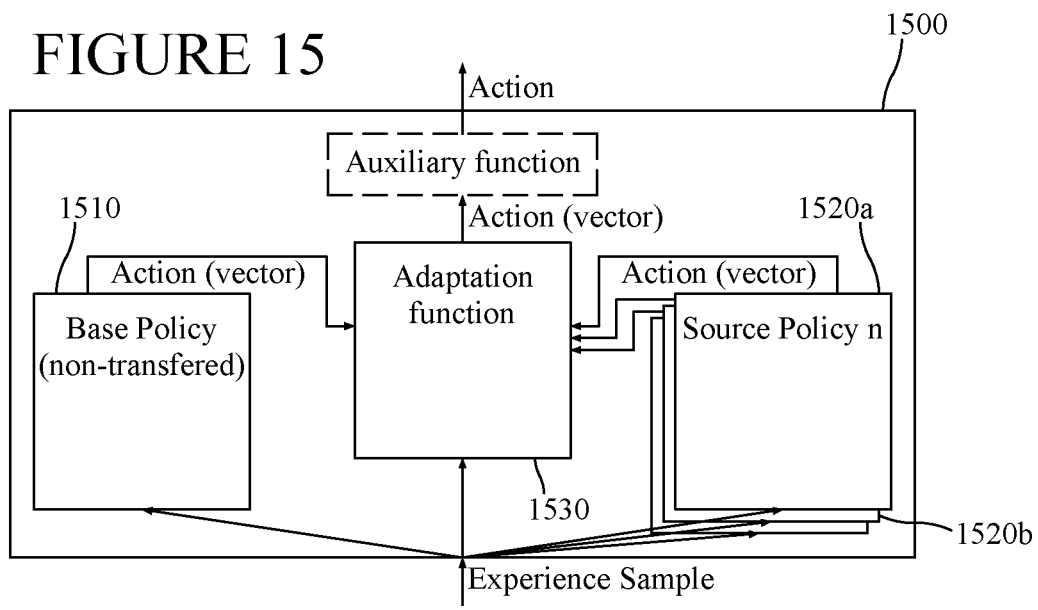
FIG. 15 illustrates an adaptive policy structure according to an embodiment.

An adaptive target learner uses one or more received SPs to construct an adaptive policy. An adaptive policy is based on one or more SPs and a base policy that is not transferred to the target learner. FIG. 15 shows the structure as well as the execution of an adaptive policy 1500. A member policy (either the base policy 1510 or one of the sources policies 1520a, 1520b, . . . ) in an adaptive policy receives an experience sample as input. In one embodiment the experience sample represents a current state of the network and each member policy produces state-action value functions (e.g., the estimated reward function based on current state or a Q-value function). The member policies may use functional approximators such as neural networks or decision forests etc., to estimate the value function. In some embodiments, the member policies select an RRM-related action based on experience samples. In other embodiments, the member policies output probability distributions over possible RRM-related actions.

The adaptation function's 1530 inputs are the experience sample and the outputs generated by the member policies based on the experience sample. The adaptation function outputs an adapted set of state-action value functions different from the ones generated by the member policies. In some examples, the adaptation function uses a model (e.g., neural network with suitable structure and parameters) to learn how to adapt to different situations based on received experience samples and state-action values received from the member policies.

In some embodiments, there is an auxiliary function that performs extra calculations using the adapted set of action-values to yield the RRM-related action. The auxiliary function may select the RRM-related action based on a maximum in the adapted set of action-values or may scale the adapted set of action-values to a suitable range (e.g., to project the state-action values into probability simplex using, e.g., a soft-max operator).

Figure 18:
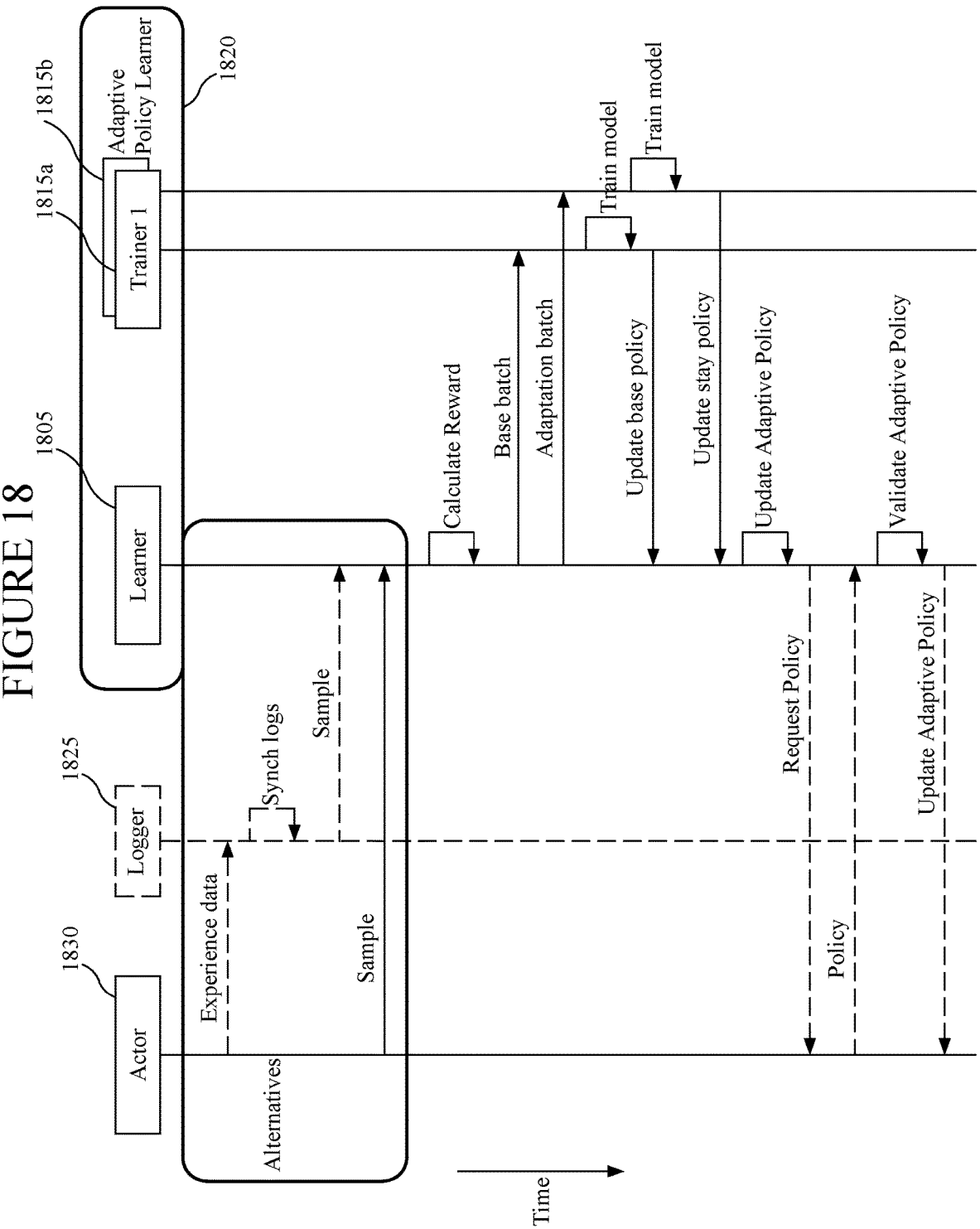
FIG. 18 is a flowchart illustrating necessary and optional steps for updating parameters of a neural network related to an adaptive function according to an embodiment.

In some embodiments, the adaptive learner may maintain and improve an adaptive policy, for example, by progressively updating the policy via training as illustrated in FIG. 18. The flowchart starts with an experience sample being input (and optionally prepared at 1610) to the source and base policies. At 1620, the source and base policies generate outputs such as state-action values based on the experience sample. The member policies may be executed sequentially or in parallel as suggested by decision block 1640 determining whether step 1630 is repeated. Once all the policies outputs are available, they are used as inputs to the adaptation function executed at 1660. Optionally, at 1650, the policies outputs may be prepared before being input to the adaptation function. Another optional step is 1670 which refers to execution of auxiliary functions on the adaptation function's output.

The adaptive learner receives information describing a history of network and actor interactions with the environment (e.g., a set of measurements describing current or past RAN states, past RRM-related actions and their respective effects), information regarding the probability of selecting different RRM-related actions, and/or feedback from the environment in response to previous RRM-related actions (e.g., suitable reward or cost functions constructed from KPI and performance measurements such as spectral efficiency, throughput, acknowledgment received upon delivery of data packets, etc.). Such information may be sent either at once or in series of smaller batches and may be used for training and validating adaptive policies. In some embodiments, the adaptive learner may receive information from another entity (e.g., a logger unit). The received information may be used for training and/or validation.

In some embodiments, the outcome (e.g., rewards or costs) of the actions taken by the adaptive policy is used to update (i.e., to train) the model parameters of both adaptive function and the base policy. In some other embodiments, the feedback related to the RRM-related actions selected by applying the adaptive policy is used to train (e.g., to update models in the adaptive function and the base policy). The outcome may include RAN states (observed via an experience sample) as well as the action-values produced by the adaptive function corresponding to the same state (i.e., the same experience sample) and selected RRM-related action (e.g., in case of state-action Q-value functions).

Figure 17:
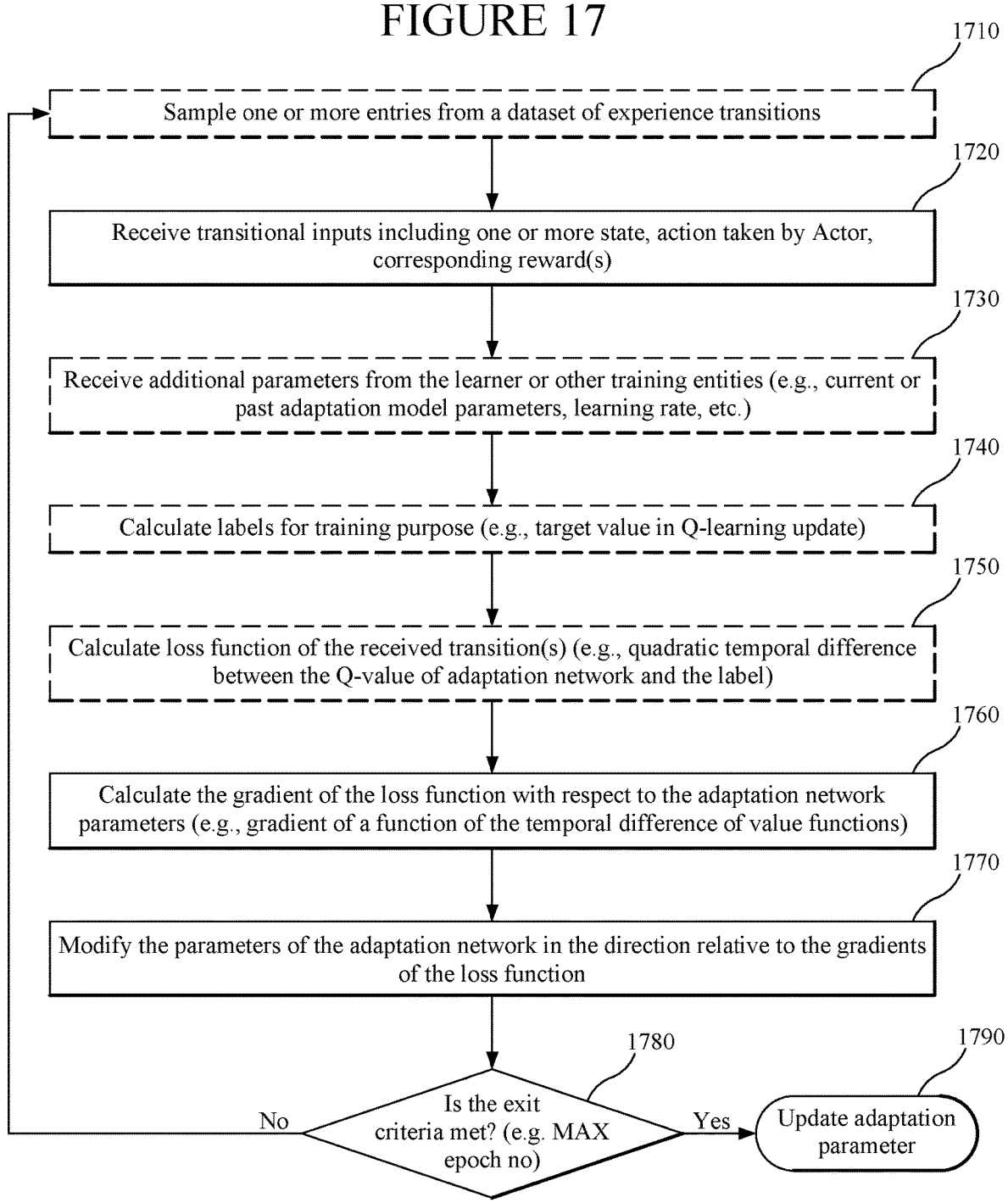
FIG. 17 illustrates a scenario for training an adaptive machine learning-based policy.

FIG. 17 is a flowchart illustrating necessary steps (framed by a continuous-line box) and optional steps (framed by dashed-line box) for updating parameters of a neural network related to an adaptive function. Gradient based methods may be used for updating the adaptive policy parameters. Training a base policy follows a similar procedure except that outputs from a base network (e.g., Q-value of the base network) are used to calculate the loss function and the gradient function of the base policy. Moreover, the gradient is calculated with respect to the base policy parameters. Note that in training of the base policy the inputs are sampled from the experience transitions collected from the interaction of the adaptive policy with the environment.

In some embodiments, the adaptive learners delegate the task of training policies to other entities. For instance, a learner entity can prepare the training batches based on the input and output data based on mentioned information for models of either adaptive function or the base policy. Then training entities could perform the training for these models possibly in a concurrent fashion. The updated models are then sent to the learner entity, which in turn updates the base policy and adaptation function. The adaptive policy is finally updated using the updated models by the learner.

In training one updates the parameters of a machine learning model (e.g., artificial neural networks, decision forests, SVMs, etc.). In particular, in training, one needs to formulate a mathematical problem to minimize a loss function (e.g., squared loss, hinge, logistic loss, etc.) of a set of inputs and output labels. The loss function measures the inconsistency between the predicted values (the output of the model given the inputs) and the actual labels. Numerical optimization algorithms (e.g., variants of gradient descent, BFGS, higher order methods such as Newton) are utilized to minimize the loss function with respect to model parameters.

In some embodiments, the transitional data from interactions between the actor and the environment (i.e., information such as state, action, reward, probability of chosen action according to exploration strategy, etc.) might be used for preparing the input data and labels used in training.

The updated models are then sent to the learner entity which in turn updates the base policy and adaptation function. The adaptive policy is finally updated using the updated models by the learner.

In some embodiments, the adaptive learner may send a request to an actor to provide its running (in production) policy. The adaptive learner may use a policy received in return for validation of updated (retrained) policies using some suitable criteria. The adaptive learner may validate a policy using a set of information describing a history of network and actor's interactions with the RAN provided earlier by the actor. This information is similar to the one used in training, but a separate set of data (which has not been previously used for training) is used for validation.

The adaptive learner sends policies (either in refined form after re-training or after validation) to the actor. In some embodiments, the adaptive learner may further send an actor configuration to the actor.

Figure 16:
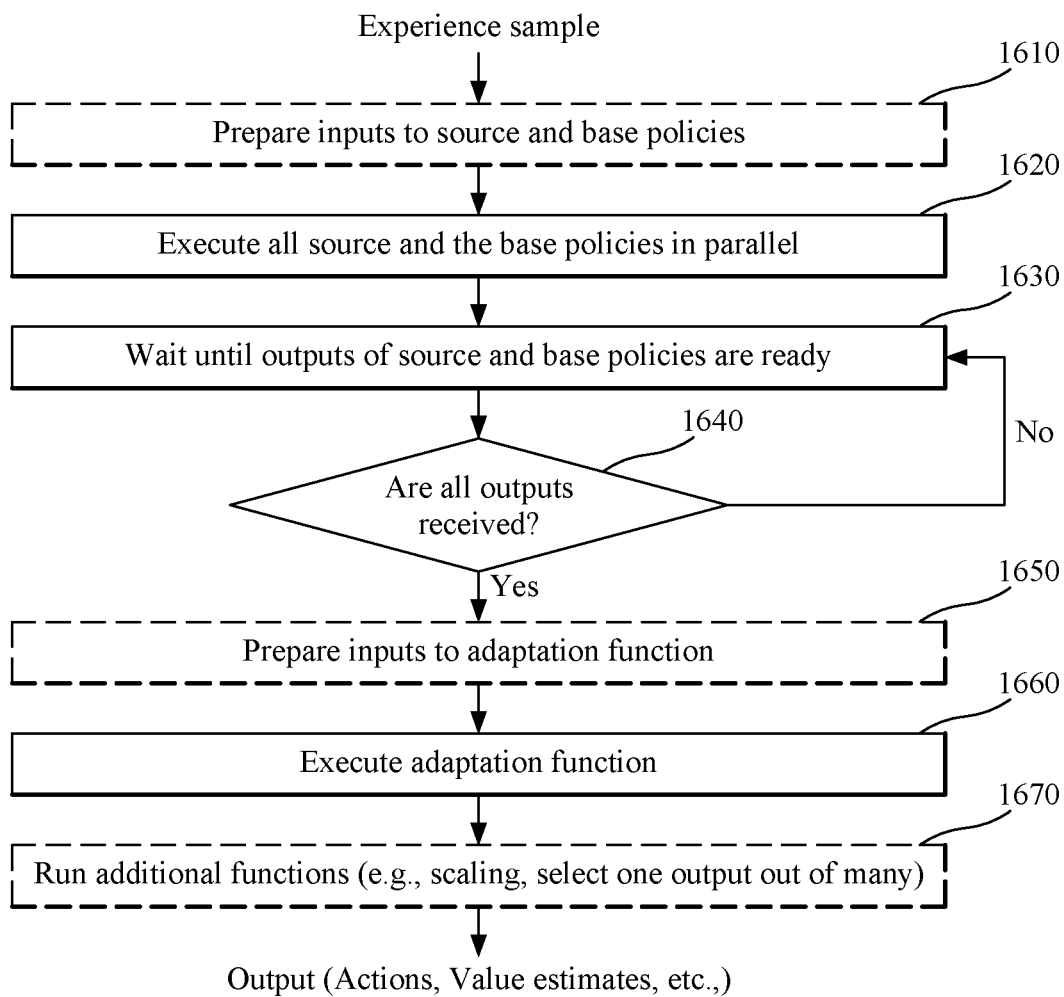
FIG. 16 is a flowchart showing execution of an adaptive policy.

FIG. 18 illustrates a scenario in which an adaptive policy learner 1820 includes a learner entity 1805 that receives information from actor 1830 and a logger 1825. The learner prepares and provides the information to trainers 1815*a* configured to train the base policy and 1815*b* configured to train a source policy (functions illustrated by blocks 1815*a* and 1815*b* may be reused or replicated). The trainers yield updated base and source policies which are then used by an adaptive policy as illustrated in FIG. 16.

In some embodiments, a target adaptive policy is used as a source policy for some other RRM-related actions, the adaptive policy being therefor sent to another learner entity.

The above-described embodiments of adaptive transfer learning make it possible to to use adaptive transfer learning in the context of RRM-related tasks in RANs. As such, potential benefits of transfer learning are harvested while negative transfer in the context of RL and RRM use cases is avoided (by using a non-transferred base policy).

The disclosed embodiments provide methods and systems associated with transfer learning for radio resource management in radio access networks. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments described herein may take the form of a computer program product stored on a computer-readable storage medium having computer-readable instructions embodied in the medium. For example, FIG. 5 depicts an electronic storage medium 540 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A network operator device performing as a source for policies related to radio resource management, RRM, in a radio access network, RAN, the network operator device comprising:
a communication interface configured to intermediate data exchange with a target learner in the RAN; and
a data processing unit connected to the communication interface and configured to prepare and supply a source policy, SP, for an RRM-related task, via the communication interface to the target learner, wherein the target learner is enabled to provide a production policy, PP, to an actor that determines an RRM-related action for accomplishing the RRM-related task, and wherein:
the SP is prepared based on knowledge related to a first cell having a first cell type, and the target learner is enabled to provide the PP related to a second cell having a second cell type;
the SP is prepared using data from multiple cells, and the target learner is enabled to provide the PP from a specific cell;
the SP is prepared using simulated data, and the target learner is enabled to provide the PP which is configured to use real network data;
the SP is prepared using a high volume of correlated low-cost sources of data, and the target learner is enabled to provide the PP configured to use a lower volume of data, which is more precise and expensive than the high volume of correlated low-cost sources of data;

the SP is prepared using offline available data, and the target learner is enabled to provide the PP configured to use online network data; and/or
the SP is prepared using 4G data or for a 4G feature, and the target learner is enabled to provided the PP configured for a 5G feature.

2. The network operator device of claim 1, wherein the SP is prepared using information about RRM-related tasks triggered by one or more other actors.

3. The network operator device of claim 1, wherein the SP is an algorithmic logic that, when fed with information related to RAN's history and actor's interactions with RAN, including RAN parameters and measurements before and/or after previous RRM-related action, outputs the RRM-related action to be performed by the actor or an implicit quantity to be used by the actor for determining the RRM-related action.

4. The network operator device of claim 1, wherein the data processing unit is further configured to maintain the SP by training and updating the SP based on feedback information received from the actor and/or one or more other actors.

5. The network operator device of claim 1, wherein the data processing unit is further configured to train and/or validate the SP.

6. The network operator device of claim 5, wherein the data processing unit performs at least one of initially generating the SP, training the SP and validating the SP using data received from the actor.

7. The network operator device of claim 1, wherein the data processing unit is also configured to provide configuration parameters for the actor.

8. The network operator device of claim 7, wherein the configuration parameters are related to an exploration strategy enabling the actor to choose the RRM-related action from plural possible RRM-related actions depending on one or more factors including a probability function, the PP, a current and/or previous RAN state.

9. A method for a network operator device performing as a source for policies related to radio resource management, RRM, in a radio access network, RAN, the method comprising:
preparing a source policy, SP, for an RRM-related task in RAN; and
supplying the SP to a target learner,
wherein the target learner is enabled to provide a production policy, PP, to an actor that determines an RRM-related action for accomplishing the RRM-related task, and wherein:
the SP is prepared using information about RRM-related tasks triggered by one or more other actors;
the SP is prepared based on knowledge related to a first cell having a first cell type, and the target learner is enabled to provide the PP related to a second cell having a second cell type;
the SP is prepared using data from multiple cells, and the target learner is enabled to provide the PP from a specific cell;
the SP is prepared using simulated data, and the target learner is enabled to provide the PP which is configured to use real network data;
the SP is prepared using a high volume of correlated low-cost sources of data, and the target learner is enabled to provide the PP configured to use a lower volume of data, which is more precise and expensive than the high volume of correlated low-cost sources of data;

the SP is prepared using offline available data, and the target learner is enabled to provide the PP configured to use online network data; and/or the SP is prepared using 4G data or for a 4G feature, and the target learner is enabled to provided the PP configured for a 5G feature.

10. A network operator device performing as a target learner policies related to radio resource management, RRM, in a radio access network, RAN, the network operator device comprising:
a communication interface configured to intermediate data exchange with a source of policies for an RRM-related task and an actor that determines an RRM-related action to accomplish the RRM-related task; and
a data processing unit connected to the communication interface and configured to receive a source policy, SP, for the RRM-related task from the source, to prepare a production policy, PP, based on the SP and to provide the PP to the actor via the communication interface,
wherein the actor is enabled to determine an RRM-related action to accomplish the RRM-related task, and wherein:
the SP is based on data related to a first sell having a first cell type, and the PP is prepared for a second cell having a second cell type;
the SP is based on data from multiple cells, and the PP is prepared a specific cell;
the SP is based on simulated data, and the PP is configured to use real network data;
the SP is based on a high volume of correlated low-cost sources of data, and the PP is configured to use a lower volume of data, which is more precise and expensive than the high volume of correlated low-cost sources of data;
the SP is based on offline available data, and the PP is configured to use online network data; and/or
the SP is based on 4G data and/or a 4G feature, and the PP is configured for a 5G feature.

11. The network operator device of claim 10, wherein the data processing unit is further configured to train and/or validate the PP.

12. The network operator device of claim 10, wherein the data processing unit also provides configuration parameters to the actor.

13. The network operator device of claim 10, wherein the data processing unit is further configured to feedback the PP and/or actor-supplied-RRM-task-related information to the source.

14. The network operator device of claim 10, wherein the data processing unit is further configured to use the SP and a base policy stored in the network operator device to generate an adaptive policy provided as the PP to the actor,
wherein the experience sample includes a history of RAN's operations, actor's interactions with the RAN, and/or parameters and measurements describing current or past RAN status.

15. The network operator device of claim 14, wherein the data processing unit is further configured to train the adaptive policy using a set of experience samples.

16. A network operator device performing as an actor in a radio access network, RAN, the network device comprising:
a communication interface configured to intermediate communication with a target learner via the RAN; and
a data processing unit connected to the communication interface and configured:
to receive a production policy, PP, for an RRM-related task from the target learner, wherein the production policy for the RRM-related task has been prepared using a source policy, SP, and wherein:
the SP is based on data related to a first sell having a first cell type, and the PP is prepared for a second cell having a second cell type;
the SP is based on simulated data, and the PP is configured to use real network data;
the SP is based on a high volume of correlated low-cost sources of data, and the PP is configured to use a lower volume of data, which is more precise and expensive than the high volume of correlated low-cost sources of data;
the SP is based on offline available data, and the PP is configured to use online network data; and/or
the SP is based on 4G data and/or a 4G feature, and the PP is configured for a 5G feature;
to determine an RRM-related action for accomplishing the RRM-related task, using the PP; and
to provide feedback to the target learner.

17. The network operator device of claim 16, wherein the data processing units explores potential RRM-related actions according to an actor configuration received via RAN.

18. The network operator device of claim 16, wherein the feedback includes training and validating data.

19. The network operator device of claim 16, wherein the feedback includes a running policy and experience data.

20. The network operator device of claim 16, wherein the data processing unit is further configured to obtain information from the environment and use the information to enhance the PP and/or to provide the feedback.

* * * * *